Patented July 20, 1937

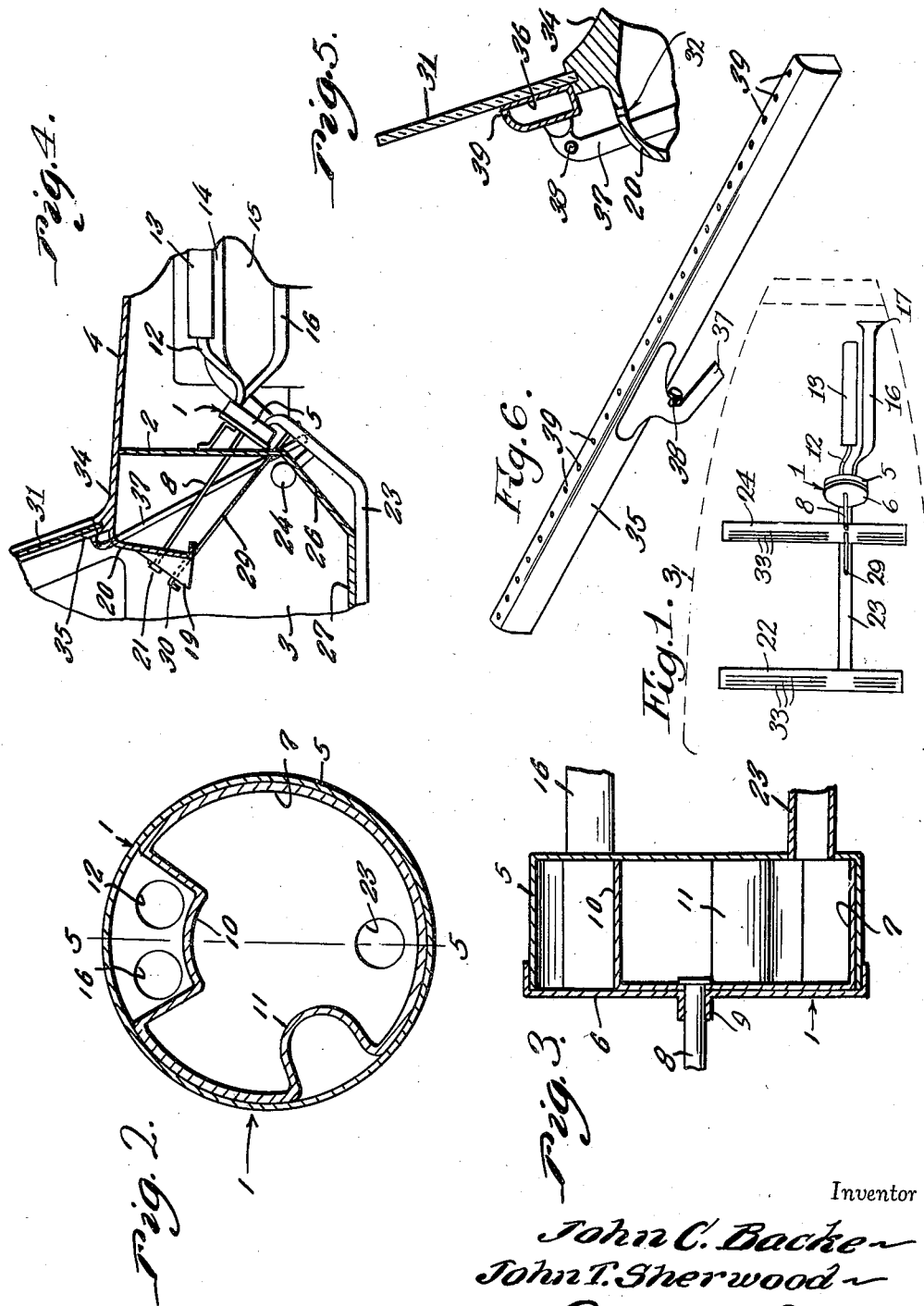

2,087,635

UNITED STATES PATENT OFFICE 2,087,635

VALVE FOR AUTOMOBILE HEATERS AND VENTILATORS

John C. Backe and John T. Sherwood, Howell, Mich.

Application January 23, 1935, Serial No. 3,112

1 Claim. (Cl. 251—87)

An important object of the present invention is to provide, in an automobile heater and ventilator, a novel valve construction, through the medium of which the temperature of the air which is introduced into the automobile body may be conveniently regulated as desired.

Other objects of the invention are to provide a valve of the character described which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawing, wherein like characters of reference designate corresponding parts throughout the several views, and wherein:—

Figure 1 is a diagrammatic plan view of an automobile showing the position of the invention mounted thereon.

Figure 2 is a detail view in section through the regulating valve.

Figure 3 is a vertical sectional view, taken substantially on the line 5—5 of Figure 2.

Figure 4 is a view in vertical longitudinal section through an intermediate portion of the automobile showing an arrangement for heating the windshield.

Figure 5 is a detail view in vertical section through the windshield heater shown in Figure 4; and Figure 6 is a perspective view of the windshield heater shown in Figures 4 and 5.

Referring now to the drawing in detail, it will be seen that the reference numeral 1 designates generally a regulating valve which is mounted on the forward side of the dashboard 2 of the automobile body 3 beneath the hood 4. As illustrated to advantage in Figures 2 and 3 of the drawing, the regulating valve 1 comprises a casing 5 to the interior of which access may be had, if desired, through the medium of a removable closure 6. Rotatably mounted in the casing 5 is a core 7 which is fixed on one end of an operating shaft 8, said shaft being journaled in the closure 6, as at 9. The valve core 7 is substantially cup-shaped and, as shown to advantage in Figure 2 of the drawing, the peripheral walls thereof include inwardly offset portions 10 and 11.

The reference numeral 12 designates a conduit which delivers heated air to the casing 5 from a heater 13 which is mounted on the exhaust manifold 14 of the engine 15 of the automobile. Also connected to the casing 5, at a point adjacent the conduit 12, is a cold air conduit 16 which terminates in an enlarged or flared forward end 17 adjacent the rear of the usual fan on the engine 18.

The operating shaft 8 extends rotatably through a raised or projecting portion 19 of the instrument board 20 of the automobile and has fixed thereon an operating knob or head 21 which is provided with a pointer for coaction with dial markings to indicate the position of the core 7.

Also communicating with the casing 5 of the regulating valve 1 is a delivery pipe 23 which communicates with tubular registers 22 and 24 which are mounted transversely on the toe board 26 and on the floor 27 of the body 3 respectively. A control valve is mounted in the delivery pipe 23 at a point adjacent the regulating valve 1, said control valve being actuated through the medium of a rod 29 which also extends rotatably through the raised portion 19 of the instrument board 20 and terminates in a right angularly extending handle portion 30.

Of course, the instrument board 20 of the automobile is located, as usual, below the windshield 31. Referring now to Figures 4 and 5 of the drawing, it will be seen that the upper portion of the instrument board 20 has formed therein an elongated opening or slot 32. The purpose of the slot 32 will be presently set forth. It is thought that the operation of the invention will be readily apparent from a consideration of the foregoing. Heated and unheated air enter the casing 5 through the conduits 12 and 16 where they are mixed and escape into the delivery pipe 23. From the pipe 23 the air is discharged into the automobile body 3 through the registers or heaters 22 and 24 which, it will be noted, have formed therein discharge slots or ports 33. A substantial proportion of the heated air from the forward register 24 rises in the space between the instrument board 20 and the dashboard 2 below the cowl 34 of the body 3. This heated air passes upwardly through the slot 32 and comes in contact with the windshield 31 of the body 3 in a manner to effectively prevent the formation of ice, snow, condensation, etc. on said windshield. The volume of air passing through the delivery pipe 23 may be controlled as desired through the medium of the above mentioned control valve. The proportions of heated and cold air entering the casing 5 may be regulated as desired by setting the core 7 in various positions. When set in the position shown in Figure 2 of the drawing, no air from the conduits 12 and 16 may pass through the casing 5. Of course, by rotating the core 7 sufficiently to move the offset 10 away from the conduits 12 and 16, both of said conduits may be brought into full communication with the casing 5 or by properly adjusting said core 7 either of the conduits 12 and 16 may be brought into partial communication with the casing 5 while the other of said conduits is completely shut off therefrom. When it is desired to bring both of the conduits 12 and 16 partially into communication with the casing 5, the offset 11 of the core 7 is moved to the proper position, the width of said offset 11 being such that the opposite walls thereof will divide said conduits 12 and 16.

Referring now to Figures 4, 5 and 6 of the drawing, it will be seen that a heater in the form of an elongated casing 35 is utilized for heating the windshield 31 of the automobile uniformly throughout its width. The casing 35 is formed to provide a flat forward wall 36 which is engaged with the windshield. A conduit 37 connects the casing 35 with the delivery pipe 23, said conduit having mounted in the upper portion thereof a control valve 38. Discharge ports 39 are provided in the casing 35. The ports 39 may be arranged to discharge the heated air upwardly adjacent the windshield 31. However, such an arrangement is not at all necessary as the casing 35 is entirely sufficient to heat the windshield uniformly throughout substantially its entire width.

It is believed that the many advantages of an apparatus in accordance with the present invention will be readily understood, and although preferred embodiments of the invention are as illustrated and described, it is to be understood that further modifications and changes in the details of construction may be resorted to which will fall within the scope of the invention as claimed.

What is claimed is:—

A mixing and regulating valve for an automobile heating and ventilating apparatus of a type including hot and cold air conduits positioned adjacent each other and a delivery pipe, comprising a casing having adjacent inlet ports and an outlet port adapted to communicate respectively with the conduits and pipe, a substantially cup-shaped core rotatably mounted in said casing, said core being open at one end for communication with the ports, said core including an inwardly extending offset in its periphery having an area sufficient to overlap both inlet ports simultaneously for controlling communication between the inlet ports and the interior of said core, the core further including another inwardly extending offset in its periphery and of an area to partially overlap the ends of both inlet ports simultaneously for partially shutting both of the inlet ports from communication with the interior of said core, and means for actuating said core.

JOHN C. BACKE.
JOHN T. SHERWOOD.